A. A. STILL.
SAFETY LATCH FOR AUTOMOBILE GEAR SHIFT LEVERS.
APPLICATION FILED NOV. 11, 1916.
1,234,579.
Patented July 24, 1917.
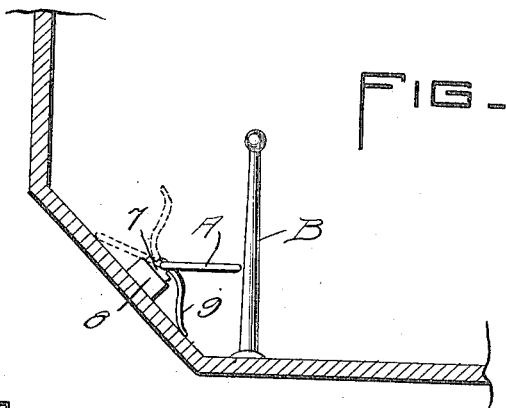
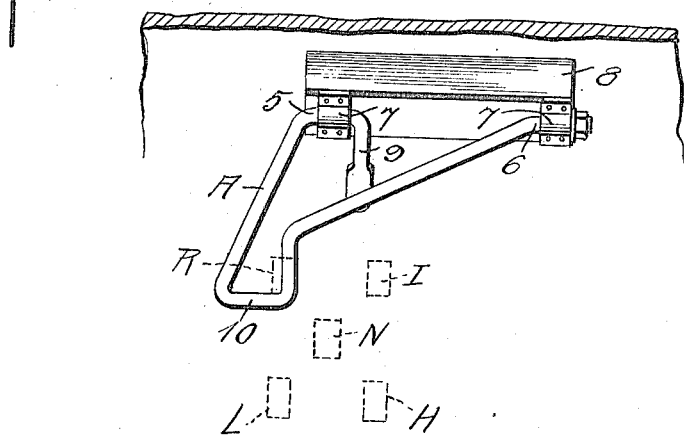
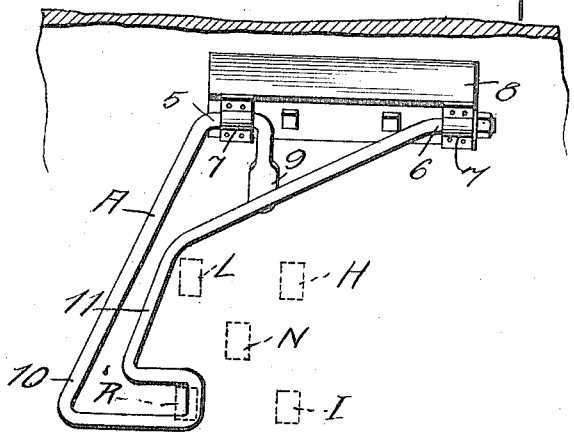
WITNESSES
INVENTOR
ABRAM A. STILL,
BY
ATTORNEYS

UNITED STATES PATENT OFFICE.

ABRAM ALLEN STILL, OF ANNETTE, CALIFORNIA.

SAFETY-LATCH FOR AUTOMOBILE-GEAR-SHIFT LEVERS.

1,234,579.  Specification of Letters Patent.  Patented July 24, 1917.

Application filed November 11, 1916. Serial No. 130,801.

*To all whom it may concern:*

Be it known that I, ABRAM A. STILL, a citizen of the United States, and a resident of Annette, in the county of Kern and State of California, have invented a certain new and useful Improvement in Safety-Latches for Automobile-Gear-Shift Levers, of which the following is a specification.

One of the principal objects of my invention is to provide an improved latch, mounted in a suitable position on the foot or dashboard of an automobile, and acting to prevent accidental movement of the gear shift lever into reverse position, thus doing away with the danger to life and limb and the danger of injury to the mechanism of automobiles, heretofore accruing to the accidental shifting of the lever into reverse position.

Another object of the invention is to provide an improved latch normally retained by gravity in position to prevent movement of the gear shift lever into reverse position, the latch being capable of actuation by the foot of the operator to be momentarily shifted out of normal position, so that the reverse position of the gear shift lever may be assumed when desirable.

Still another object of my invention is to provide an improved safety latch of the nature described, which is extremely simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawing, in which like characters represent like parts throughout the several figures and in which—

Figure 1 is a partial longitudinal sectional view taken through the forward portion of the body of an automobile, representing the gear shift lever and the safety latch in side elevation;

Fig. 2 is a horizontal sectional view through the foot or dashboard, showing the latch in top plan view, the various positions assumed by the gear shift lever in shifting the gears being indicated in dotted lines, and Fig. 3 represents a similar view of a modified form of the invention.

Referring more particularly to the drawing, the latch indicated at A, is made of a suitable length of metal or of heavy wire bent to the proper shape. In each form of the device the latch presents spaced and alined bearing portions 5 and 6 respectively, which bearing portions are pivotally mounted in the bearings 7 secured on a suitable block 8. This block is mounted in any suitable manner on the footboard of the automobile with which the latch is to be used, as indicated in Fig. 1.

From the free end of the bearing portion 5 there extends downwardly a supporting arm 9, which is bent into proper form to rest against the inclined portion of the footboard whereby to support the main portion of the latch in approximately horizontal position. When the latch is in the position indicated in full lines in Fig. 1, the gear shift lever B will be prevented from being moved into the "reverse" position. When, however, it is desired to allow of this position being assumed by the lever the latch may be shifted by the foot of the operator into the dotted line position indicated in Fig. 1, that is, lifted or turned backwardly to rest against the footboard above the block, so as not to present an obstruction by the assumption of the lever of "reverse" position.

The dotted line positions of the gear shift lever shown in Figs. 2 and 3 are indicated by the letters N, I, H, L, and R, indicating respectively the neutral, intermediate, high, low, and reverse positions into which the gear shift lever may be moved, as will be readily understood. In each of the two forms of the latch shown in Figs. 2 and 3, a portion of the material from which the latch is formed, occurring between the bearing portions 5 and 6, is bent to form a nose, indicated generally at 10, which nose portion when the latch is in normal operative position, presents an obstacle to the assumption by the gear shift lever of the "reverse" position.

In the arrangement shown in Fig. 2, in which the lever is shifted forwardly to attain the "reverse" position, it will be noted that the nose portion 10 is so formed as to present an obstruction to the forward movement of the lever into "reverse" position from "neutral." The same object is attained by the formation of the lever in the modification shown in Fig. 3, in which the arrangement is such that the lever must be shifted rearwardly to attain the "reverse" position. In this form the nose portion 10 is somewhat longer than in the form represented in Fig. 2, and a part of this nose member, as indicated at 11, is inset whereby the field of operation of the gear shift lever, with the exception of the assumption by the said lever of the "reverse" position is unobstructed.

When the gear shift lever is to be moved into "reverse" position, the latch is lifted by the foot of the operator and thrown upwardly against the dashboard, in position, as indicated in Fig. 1, to be retained by the action of gravity. The entire field of operation of the lever will thus be cleared, so that the latter is free to be moved into position for reversing the automobile.

When it is desired to again obstruct the field of movement of the lever, the latch is swung downwardly into normal position where it will be retained by the supporting member 9, as clearly shown.

Although I have described the preferred embodiments of my invention, I may desire to make such changes in the construction, combination, and arrangement of parts thereof, as do not depart from the spirit of the invention and the scope of the appended claims.

The block 8 upon which the latch is mounted, it will be noted, is arranged between the lever B and the dashboard of the machine, and does not project toward the steering wheel and the control pedals of the machine, but projects away from them, it being understood that the arrangement indicated in the drawing is that used in connection with a left-hand drive automobile. Thus, the space around the operating pedals is not hampered by the block 8. In order to properly position the nose portion of the latch relatively to the field of operation of the gear shift lever, it will be noted that the latch extends at an inclination to the block upon which it is mounted.

I claim:—

1. A safety latch formed of a length of material having alined spaced bearing portions, a block adapted to be connected with the footboard of an automobile body, said bearing portions being pivotally connected with the block, one of said bearing portions being extended to form a supporting arm adapted to engage against the automobile floor for normally retaining the latch in approximately horizontal position, said latch being further provided with a nose portion adapted, when the latch is in normal position, to present an obstruction to the assumption by the gear shift lever of the automobile, of the "reverse" position.

2. A safety latch having means whereby it may be pivotally connected with the footboard of an automobile body, a downwardly extending supporting arm formed on the latch, engaging against the footboard for normally retaining the latch in approximately horizontal position, said latch being provided with means for presenting, when the latch is in normal position, an obstruction to the movement of the gear shift lever of the automobile into "reverse" position.

ABRAM ALLEN STILL.

Copies of this patent may be obtained for five cents each, by addressing the "Commissioner of Patents, Washington, D. C."